(12) United States Patent
Fisher et al.

(10) Patent No.: US 11,292,280 B2
(45) Date of Patent: Apr. 5, 2022

(54) PRINTABLE AND SCUFF RESISTANT SILICONE RELEASE COATING FOR LINERLESS THERMALLY-RESPONSIVE RECORD MATERIAL

(71) Applicant: APPVION, INC., Appleton, WI (US)

(72) Inventors: Mark Fisher, Appleton, WI (US); Yves Defrenne, Appleton, WI (US); Lei Xu, Appleton, WI (US)

(73) Assignee: APPVION OPERATIONS, INC., Appleton, WI (US)

( * ) Notice: Subject to any disclaimer, the term of this patent is extended or adjusted under 35 U.S.C. 154(b) by 307 days.

(21) Appl. No.: 15/855,608

(22) Filed: Dec. 27, 2017

(65) Prior Publication Data

US 2019/0193447 A1 Jun. 27, 2019

(51) Int. Cl.

| | |
|---|---|
| *B41M 5/40* | (2006.01) |
| *C09D 7/61* | (2018.01) |
| *C09D 183/04* | (2006.01) |
| *B41M 5/44* | (2006.01) |
| *C08G 77/20* | (2006.01) |
| *B41M 5/42* | (2006.01) |

(52) U.S. Cl.
CPC .............. *B41M 5/40* (2013.01); *B41M 5/443* (2013.01); *C09D 7/61* (2018.01); *C09D 183/04* (2013.01); *B41M 5/426* (2013.01); *B41M 2205/04* (2013.01); *C08G 77/20* (2013.01)

(58) Field of Classification Search
CPC ........ B41M 5/40; B41M 5/426; B41M 5/443; B41M 2205/04; C08G 77/20; C09D 7/61; C09D 183/04
See application file for complete search history.

(56) References Cited

U.S. PATENT DOCUMENTS

| | | | | |
|---|---|---|---|---|
| 4,535,123 | A * | 8/1985 | Sasaki | ..................... C08L 83/04 524/861 |
| 6,071,585 | A * | 6/2000 | Roth | ..................... B42D 15/00 156/248 |
| 9,199,503 | B1 * | 12/2015 | Fisher | ..................... B41M 5/443 |
| 2011/0152459 | A1 * | 6/2011 | Berg | ........................ C08K 9/06 525/106 |

* cited by examiner

*Primary Examiner* — Sathavaram I Reddy
(74) *Attorney, Agent, or Firm* — Muncy, Geissler, Olds and Lowe, P.C.

(57) ABSTRACT

The present invention is directed to a composition and method of providing a silicone release coating material for a thermally-responsive record material while maintaining strong printability with UV inks and water based inks, as well as scuff resistance. The thermally-responsive record material includes a substrate with first and second surfaces. The first surface includes a heat sensitive coating having a colorless dye precursor and an acidic developer material in contiguous relationship. The release coating is provided with an aqueous mixture of a water soluble or water dispersible polymeric material, a silicone release agent, an excess of platinum catalyst, and a hydrophilic silica. The platinum catalyst is preferably provided in excess of 150 ppm. The hydrophilic silica is preferably fumed silica. The release coating is cured at a temperature of 160° C. or less, or even from 70° C. to 120° C.

14 Claims, No Drawings

PRINTABLE AND SCUFF RESISTANT SILICONE RELEASE COATING FOR LINERLESS THERMALLY-RESPONSIVE RECORD MATERIAL

BACKGROUND OF THE INVENTION

Field of the Invention

This invention relates to a silicone release coating, in particular, to a printable and scuff resistant silicone release coating for a thermally-responsive record material.

This invention particularly concerns a thermally-responsive record material capable of forming a substantially non-reversible image and useful for producing functional bar codes, text, images or other indicia. The invention teaches compositions and methods for forming improved printable and scuff resistant silicone release coating for thermally-sensitive record materials which can be imaged without printhead debris, background discoloration, surface scuffing of the record material, dusting and other image defects.

Description of the Background Art

Thermally-responsive record material systems are well known in the art and are described in many patents. For example, in the U.S. Pat. Nos. 3,539,375; 3,674,535; 3,746,675; 4,151,748; 4,181,771; 4,246,318; and 4,470,057, which are incorporated herein by reference. In these systems, basic colorless or lightly colored chromogenic material and acidic color developer material are contained in a coating on a substrate which, when heated to a suitable temperature, melts or softens to permit the color-forming materials to react, and thereby producing a colored mark.

Thermally-responsive record materials have a characteristic thermal response and desirably produce a colored image of sufficient intensity upon a selective thermal exposure.

Thermally-responsive record materials are increasingly utilized for labels used to record various information such as text, bar code imaging, graphics, alphanumeric characters and the like because such labels can be readily created by printer equipment in the field at the point of use and application.

Bar codes provide a convenient means for computerized inventory or goods handling and tracking. To function properly, it is necessary that the bar codes have a high print contrast signal, and that the thermally-responsive material on which the bar code is imaged resist unwanted bar width growth after imaging. In other words, the characters or bars must not only be intensely imaged, but must be sharp, unbroken and/or free of pin holes. It is also necessary that when read by a scanner a high percentage of scans result in successful decoding of the information in the bar code. The percentage of successful decodes of the bar code information must be maintained at a high value for the thermally-responsive record material to gain wide commercial acceptance for use in bar coding applications.

Further, to improve resource conservation, interest has grown in linerless labels which can eliminate a liner material often employed with tacky or pressure sensitive adhesives which protect the adhesive layer prior to the label application.

Keeton, U.S. Pat. No. 8,764,323 B2, describes a heat activated linerless label where one or more printheads can selectively heat activate specific adhesive portions of a label. A sub-coat isolation layer is taught to avoid adverse interaction between chemicals and/or impurities of the paper with the thermally sensitive coating. Additionally, a top coat is taught optionally applied over the thermally-sensitive coating.

Matsubayashi et al., U.S. Pub No.: 2007/0092665, references Japanese Patent Application Second Publication No. Hei 4-15110 as describing a heat sensitive recording adhesive label with a release agent layer on the surface of a heat sensitive recording sheet which also relies on a blocking layer. Hei 4-15110 describes a heat sensitive color-developing sheet on which a polyvinylalcohol blocking or protective undercoat layer is first applied. Over the blocking layer, or isolation layer, a solventless ultraviolet curing silicone of organopolysiloxanes with mercapto and vinyl groups along with acetophenone curing initiator is applied, followed by ultraviolet irradiation to form a release agent. An adhesive such as an acrylic emulsion adhesive is coated on the undercoat isolation or blocking layer on the opposite surface.

Fisher et al., U.S. Pat. No. 9,199,503 B1 describes a composition and method of providing an improved thermally responsive record material useful for linerless labels. The record material comprises a support having provided thereon on one surface an adhesive material, and on at least one other surface, a heat sensitive imaging coating. Further, a release coating is applied over the heat sensitive imaging coating. The release coating is in direct contact with the heat sensitive imaging coating, and provides an improved surface for direct thermal printing and release properties.

Traditional release coats are based on silicone, and are known to rapidly build up dust of loose silicone and other materials under the printhead. This leads to poor image quality, equipment malfunction, or need for regular cleaning and maintenance.

Buildup ultimately can also lead to spacing from the imaging media and poor heat transfer. The poor heat transfer manifests itself as poorly imaged bands, and in extreme cases, in areas with no visible image. These problems have limited the acceptability of linerless thermally imaging label products in demanding applications.

To overcome these issues, a known method of performing the press printing before application of the silicone release coat has been used.

Another way for overcoming these issues is to use a non-silicone nature release coats. The known limitations of the non-silicone release coats, however, are that these non-silicone nature release coats require the use of weak adhesives. The use of weak adhesives limits the use of labels for repositionable or removable applications, rather than permanent applications that require the use of stronger adhesives.

Accordingly, there exists a need for improved printable and scuff resistant silicone release coating for thermally-responsive record materials.

SUMMARY OF THE INVENTION

In view of the forgoing and other exemplary problems, drawbacks and disadvantages of the conventional methods and compositions, an exemplary feature of the present invention is to provide a silicone release coating for a thermally-responsive record material while maintaining strong printability with UV inks and water based inks, as well as scuff resistance.

According to an embodiment of this invention, the release coating comprises an aqueous mixture of a water soluble or water dispersible polymeric material, a silicone release agent, an excess of platinum catalyst, and a hydrophilic silica. The silicone release coating is formed by being applied directly on the heat sensitive coating.

The platinum catalyst is preferably provided in excess of 150 ppm. The hydrophilic silica is preferably a fumed silica.

The thermally-responsive record material includes a substrate having first and second surfaces. The first surface is provided with a heat sensitive coating having one or more layers of a substantially colorless dye precursor and an acidic developer material in substantially contiguous relationship.

The record material may also include a binder material.

The heat sensitive coating upon being heated reacts with the dye precursor to develop color. The release coating is cured at a temperature of 160° C. or less, or even from 70° C. to 120° C. without visible background discoloration of the heat sensitive coating to a scuff resistant hardness.

The present invention also discloses a method of providing a thermally-responsive record material useful for linerless labels with the improved silicone release coating. The record material comprises a support having provided thereon on a first surface an adhesive material, and on a second surface, the heat sensitive imaging coating and the silicone release coating.

The method includes applying to the second surface, the heat sensitive color-forming composition having a binder material and a substantially colorless dye precursor and an acidic developer material in substantially contiguous relationship.

The silicone release coating material overcoats the heat sensitive coating and is in direct contact with the heat sensitive coating. The silicone release coating material includes the water soluble or water dispersible polymeric material, the silicone release agent, the excess of platinum catalyst, and the hydrophilic silica. The platinum catalyst is present in excess of 150 ppm. The second layer is cured at a temperature at or below 160° C.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION

Aspects of the invention are disclosed in the following description directed to specific embodiments of the invention. Alternate embodiments may be devised without departing from the scope of the invention. Additionally, well-known elements of the invention will not be described in detail or will be omitted so as not to obscure the relevant details of the invention.

The present invention is directed to an improved silicone release coating material for a thermally-responsive record material useful for linerless labels.

According to an embodiment of the present invention, the silicone release coating includes an aqueous mixture of a water soluble or water dispersible polymeric material, a silicone release agent, an excess of platinum catalyst, and a hydrophilic silica. The silicone release coating is applied directly onto the heat sensitive coating.

The thermally-responsive record material includes a substrate having first and second surfaces. The first surface is provided with a heat sensitive coating having one or more layers of a substantially colorless dye precursor and an acidic developer material in substantially contiguous relationship.

Upon being heated, the dye precursor reacts with the acidic developer to develop color. The release coating is cured at temperature of from 70° to 120° C. or even up to 160° C. without visible background discoloration.

The present invention also discloses a method of providing a thermally-responsive record material useful for linerless labels with the improved silicone release coating. The record material comprises a support having provided thereon on a first surface an adhesive material, and on a second surface, the heat sensitive imaging coating and the silicone release coating.

The method includes applying to the second surface, the heat sensitive color-forming composition having a binder material and a substantially colorless dye precursor and an acidic developer material in substantially contiguous relationship.

The silicone release coating material overcoats the heat sensitive coating and is in direct contact with the heat sensitive coating. The silicone release coating material includes the water soluble or water dispersible polymeric material, the silicone release agent, the excess of platinum catalyst, and the hydrophilic silica. The platinum catalyst is present in excess of 150 ppm. The second layer is cured at a temperature at or below 160° C.

An embodiment of the present invention relates to the improved record material useful for linerless label applications. Linerless construction typically requires a separator layer or prime coat or isolation layer or blocking layer. Such an additional layer reduces the heat transfer and sensitivity of the thermally imaging layer or heat sensitive imaging coating. It is also desirable to increase scuff resistance and receptiveness to UV and water based inks for press printing.

Traditional release coats based on silicone are known to rapidly build up dust of loose silicone and other materials under the printhead leading to poor image quality, equipment malfunction, or need for regular cleaning and maintenance. Buildup ultimately can lead to spacing from the imaging media and poor heat transfer. The poor heat transfer manifests itself as poorly imaged bands, and in some areas with no visible image. These problems have limited the acceptability of linerless thermally imaging label products in demanding applications such as bar coding where poor imaging qualities translate to scanner misreads or unreadable labels.

The invention overcomes many of these problems by teaching the silicone release coat and method of application achieving a high level of cure and mechanical and/or chemical bonding with an active coat or a thermally imaging coating. The silicone release coating according to this invention minimizes dusting, increases sensitivity, leads to a higher quality image capability, and receptiveness to UV and water based inks for press printing.

The silicone release coating includes the heat curable silicone release agent or a polysiloxane release agent. These agents are available commercially. For example, as Silforce silicone emulsions (Momentive Performance Materials, Albany, N.Y.) or Silcolease silicone emulsions (Bluestar Silicones, East Brunswick, N.J.).

In another embodiment, the release agent can include a UV or heat curable release agent comprising silicone, or alternatively polysiloxane. Griswold et al., U.S. Pat. No.

6,077,611, incorporated by reference, describes aqueous silicone release emulsions useful as a release agent for forming the release coating of the invention. These release agents comprise condensation curable and addition curable silicone emulsions with a polymeric material such as an aqueous polyurethane emulsion.

The release agent can comprise polysiloxane polymer such as an alkenyl substituted polysiloxane, and a hydride functional cross-linking silicone such as a methyl hydrogen siloxane polymer, or methyl hydrogen polysiloxane, silanol stopped polysiloxane, and various organosiloxanes.

The polymeric material of the release coating can comprise among other polymers, and by way of illustration and not limitation, polyurethanes, reaction products of polyisocyanates, polydiisocyanates, polyisocyanurates, cycloaliphatic polyisocyantes, aromatic polyisocynates, with various polyols and polyether polyols. Exemplary polymeric material of the release coating can include reaction products of various polyisocyanates or isocyanurates with various polyols or polyether polyols. For example, the polyisocynates can comprise polyisocyanate having at least two isocyanate (—NCO) functionalities per molecule, such as diisocyanate monomers or oligomers, aliphatic polyisocyanates such as 1,6-hexamethylene diisocyanate, and isocyanurate-containing derivatives; cycloaliphatic polyisocyanates such as 4,4'-mthylene bis(cyclohexyl isocyanate), cyclohexane 1,4-diisocyanate and isocyanurate derivatives; aromatic polyisocyanates such as 4,4'-diphenylmethane diisocyanate, xylyene diisocyanate, toluene diisocyanate, isophorone diisocyanate, 1,5-naphthalene diisocyanate, 4,4',4''-triphenylmethane diisocyanate, and its isocyanurate-containing derivatives. Mixtures or the reaction products of polyisocyanates can be used. Polyisocyanates containing the reaction products of diisocyanate including isocyanurate, urea, allophanate, biuret, carbodiimide, and uretonimine entities can also be used. The foregoing can be reacted with various polyols such as polyols having at least two hydroxy functionalities per molecule and a molecular weight ranging from 250 to 5000 g/mole. The polyol may be selected from those commonly found in polyurethane manufacturing. They include hydroxy-containing or terminated polyesters, polyethers, polycarbonates, polythioethers, polyolefins, and polyesteramides. Suitable polyester polyols include hydroxy-terminated reaction products of ethylene glycol, propylene glycol, diethylene glycol, neopentyl glycol, 1,4-butanediol, furan dimethanol, polyether diols, or mixtures thereof, with dicarboxylic acids or their ester-forming derivatives. Polyesters obtained by the polymerization of lactones, such as caprolactone may also be used.

Polyether polyols useful for the polyurethane reaction for the polymeric material of the release coating include products obtained by the polymerization of a cyclic oxide including ethylene oxide, propylene oxide or tetrahydrofuran, or mixtures thereof. Polyether polyols include polyoxypropylene, polyols, polyoxyethylene, polyols, poly(oxyethylene-co-oxypropylene) polyols, polyoxytetramethylene, polyols.

Polycarbonate polyols useful for the polyurethane reaction for the polymeric material of the release coating include reaction products obtained by reacting diols such as 1,3-propanediol, 1,4-butanediol, 1,5-pentanediol, 1,6-hexanediol, diethylene glycol with diaryl carbonates such as diphenyl carbonate, or with phosgene, or with aliphatic carbonate, or with cycloaliphatic carbonate. Commercial polycarbonate diols include Duracarb 120 series aliphatic diols and Durocarb 140 series cylco aliphatic diols, both of PPG Industries.

The level of platinum catalyst in the release coating is used in excess. The increased platinum loadings, although shortening pot life, have the benefit of enabling a sufficient level of cure of the release coat below about 160° C. or even below about 120° C., or from 80° C. to 150° C. or even from 70° C. to 100° C., or even from 70° C. to 120° C. or even 70° C. to 85° C. Preferably, the platinum catalyst is present in excess of 150 ppm, and even more preferably, in excess of 191 ppm.

The platinum catalyst can have an oxidation state from 0 to IV. Exemplary platinum catalysts include chloroplatinic acid and olefin complexes, platinum (0) complexes containing vinyl-siloxane ligands, platinum (II) chloride, salts of chloroplatinic acid, tetrachloroplatinic acid, platinum (IV) chloride, hexachloroplatinic acid, hexachloroplatinic acid ammonium salt, platinum (II) oxide, platinum (II) hydroxide, platinum (IV) dioxide, platinum (IV) oxide, platinum (IV) disulfide, platinum (IV) sulfide, potassium hexachloroplatinate (IV), dichloro(cycloocta-1,5-diene) platinum (II), ammonium salts of chloroplatinic acid, etc. Exemplary platinum catalysts include commercially available catalysts such as Catalyst 454E (Wacker Chemical Corporation, Adrian, Mich.), Cat-PM-10A Shin-Etsu Chemical (Tokyo, Japan).

The release coating further includes hydrophilic silica, such as amorphous silica, fumed silica, colloidal silica, precipitated silica and silica gels, preferably, precipitated silica and/or fumed silica, and more preferably fumed silica with a surface area over 175 m2/g. Fumed silicas are available commercially such as Aerosil® 150 BET surface 135-165 m2/g, Aerosil® 200 BET surface 175-225 m2/g, and Aerosil® 300 BET surface 270-330 m2/g (Evonik Industries, Germany).

In one embodiment of the present invention, the fumed silica is present in an amount between 10-40 parts of composition, and preferably 20-30 parts.

Surprisingly, the addition of the hydrophilic silica to the release coating material greatly improves scuff resistance and press printing results.

The record material according to the invention has a non-reversible image in that it is non-reversible under the action of heat. Generally, the coating of the record material of the invention is a dewatered solid at ambient temperature.

According to an embodiment of the present invention, the color-forming system of the record material of the present invention comprises the electron donating dye precursors, also known as chromogenic material, in its substantially colorless state together with an acidic developer material.

The color-forming system relies upon melting, softening, or subliming one or more of the components to achieve reactive, color-producing contact with the chromogen. Substantially colorless for purposes of the invention is understood to mean colorless or lightly or faintly colored.

Various fluorans and leuco dye precursors may be used, including, without limitation, 2-anilino-3-methyl-6-dibutylaminofluoran, including the various crystalline or recrystallized forms such as .alpha. or .beta.

The record material includes a substrate or support material which is generally in a sheet form. For purposes of this invention, sheets can be referred to as support members and are understood to also mean webs, ribbons, tapes, belts, films, cards and the like. Sheets denote articles having two large surface dimension and a comparative small thickness dimension. The substrate or support material can be opaque, transparent or translucent and could, itself, be colored or not. The material can be fibrous including, for example, preferably paper and filamentous synthetic materials and combinations with papers and films. It can also be a film including, for example, cellophane and synthetic polymeric sheets cast, extruded, or otherwise formed. Neutral sized base paper has been used in thermally-imaged record systems for 25 years and is a preferred substrate. However, various kinds and types of substrates, and combinations can be selected in various embodiments.

The components of the heat sensitive coating are in substantially contiguous relationship, substantially homogeneously distributed throughout the coated layer or layers deposited on the substrate. For purposes of this invention the term "substantially contiguous" shall mean that the color-forming components are positioned in sufficient proximity such that upon melting, softening or subliming one or more of the components, a reactive color-forming contact between the components is achieved.

As is readily apparent to the person of ordinary skill in this art, these reactive components can be in one layer or can be positioned in separate layers using multiple layers. In other words, one component, such as color-former, can be positioned in a first layer, and co-reactive or modifier components positioned in a subsequent layer or layers. All such arrangements are understood herein as being substantially contiguous, and intended as included in the term heat sensitive coating.

The acidic developer to dye precursor ratio by weight is preferably maintained at from 1:1 to about 2:1. The modifier to dye precursor ratio by weight is preferably maintained at from 0.3:1, to about 1:1, or even greater than 1:1.

In manufacturing of the record material, a coating composition is prepared including a fine dispersion of the components of the color-forming system, and a binder material, preferably polymeric binder such as polyvinyl alcohol.

The heat-sensitive coating composition can additionally contain pigments, such as clay, talc, silicon dioxide, aluminum hydroxide, calcined kaolin clay and calcium carbonate, and urea-formaldehyde resin pigments at from 0 to 30%, or preferably 0 to 15% by weight of the heat-sensitive coating. Other optional materials include natural waxes, Carnauba wax, synthetic waxes, lubricants such as zinc stearate; wetting agents; defoamers, other modifiers and anti-oxidants. The modifier generally does not impart any image on its own but as a relatively low melt point solid, acts as a solvent to facilitate reaction between the mark-forming components of the color-forming system. Optionally, though not preferred in the invention due to interference with heat transfer as described above, the thermally-sensitive record material can be top coated with a polymeric coating such as polyvinyl alcohol.

The color-forming system components are substantially insoluble in the dispersion vehicle (preferably water) and are ground to an individual average particle size of less than 10 microns, preferably less than 3 microns or smaller. The polymeric binder material is substantially vehicle soluble although latexes are also eligible in some instances. Preferred water soluble binders, which can also be used as topcoats, include polyvinyl alcohol, hydroxyl ethylcellulose, methylcellulose, methyl-hydroxypropylcellulose, starch, modified starches, gelatin and the like. Eligible latex materials include polyacrylates, styrene-butadiene, rubber latexes, polyvinylacetates, polystyrene, and the like. The polymeric binder is used to protect the coated materials from brushing and handling forces occasioned by storage and use of thermal sheets. Binder should be present in an amount to afford such protection and in an amount less than will interfere with achieving reactive contact between color-forming reactive materials.

Coating weights can effectively be about 0.1 to about 9 grams per square meter (gsm), or even from 1 to about 9 gsm, or even from 3 to about 9 gsm and preferably about 5 to 6 gsm. The practical amount of color-forming materials is controlled by economic considerations, functional parameters and desired handling characteristics of the coated sheets.

Electron-donating dye precursors or chromogens include chromogenic compounds such as the phthalide, leucoauramine and fluoran compounds. These chromogenic materials or electron donating dye precursors are well known color-forming compounds for use in color-forming record systems. Examples of the compounds include Crystal Violet Lactone (3,3-bis(4-dimethylaminophenyl)-6-dimethylaminophthalide), (U.S. Pat. No. RE 23,024); phenyl-, indolyl, pyrrolyl, and carbazolyl-substituted phthalides (for example, in U.S. Pat. Nos. 3,491,111; 3,491,112; 3,491,116; 3,509, 174); nitro-, amino-, amido-, sulfonamide-, aminobenzylidene-, halo-, aniline-substituted fluorans (for example, the U.S. Pat. Nos. 3,624,107; 3,641,011; 3,642,828; 3,681, 390); spirodipyrans (U.S. Pat. No. 3,971,808); and pyridine and pyrazine compounds (for example, in U.S. Pat. Nos. 3,775,424 and 3,853,869). Other specifically eligible chromogenic compounds, not limiting the invention in any way are: 3-diethylamino-6-methyl-7-anilino-flouran (U.S. Pat. No. 4,510,513); 3-dibutylamino-6-methyl-7-anilino-fluoran; 3-dibutylamino-7-(2-chloroanilino) fluoran; 3-(N-ethyl-N-tetrahydrofurfurylamino)-6-methyl-7-3, 5'6-tris(dimethylamino)spiro[9H-fluorene-9,1'(3H)-isobenzofuran]-3'-one; 7-(1-ethyl-2-methylidole-3-yl)-7-(4-diethylamino-2-ethoxyphenyl)-5,7-dihy-drofuro[3,4-b]pyridine-5-one (U.S. Pat. No. 4,246,318); 3-diethylamino-7-(2-chloroanilino) fluoran (U.S. Pat. No. 3,920,510); 3-(N-methylcyclohexylamino)-6-methyl-7-anilinofluoran (U.S. Pat. No. 3,959, 571); 7-(1-octyl-2-methylindole-3-yl)-7-(4-diethylamino-2-ethoxyphenyl)-5,7-dih-ydrofuro]3,4-b]pyridine-5-one; 3-diethylamino-7,8-benzofluoran; 3,3-bis(1-ethyl-2-methylidole-3-yl)phthalide; 3-diethylamino-7-enilinofluoran; 3-diethylamino-7-benzylaminofluoran; 3'-phenyl-7-dibenzylamino-2,2'-spirodi-[2H-1-benzopyran] and mixtures of any of the following.

The developer is preferably bis(4-hydroxy-3-allylphenyl) sulphone.

Other known developer materials may also be included provided not used in an amount so as to detract from the functionality of the combination of the invention. Other acidic developer materials include the compounds listed in Baum, U.S. Pat. No. 3,539,375 as phenolic reactive material, particularly the monophenols and diphenols. Acidic developer materials also include, the following compounds: 4,4'-isopropylidinediphenol (Bisphenol A); p-hydroxybenzaldehyde; p-hydroxybenzophenone; p-hydroxypropiophenone; 2,4-dihydroxybenzophenone; 1,1-bis(4-hydroxyphenyl)cyclohexane; salcyanilide; 4-hydroxy-2-methylacetophenone; 2-acetylbenzoic acid; m-hydroxyacetanilide; p-hydroxyacetanilide; 2,4-dihydroxyacetophenone; 4-hydroxy-4'-methylbenzophenone; 4,4'-dihydroxybenzophenone; 2,2-bis(4-hydroxyphenyl)-4-methylpentane; benzyl 4-hydroxyphenylketone; 2,2-bis(4-hydroxyphenyl)-5-methylhexane; ethyl-4,4-bis(4-hydroxyphenyl)-pentanoate; isopropyl-4,4-bis(4-hydroxyphenyl)pentanoate; methyl-4,4-bis (4-hydroxyphenyl) pentanoate; alkyl-4,4-bis(4-hydroxyphenyl) pentanoate; 3,3-bis(4-hydroxyphenyl)(-pentane; 4,4-bis(4-hydroxyphenyl)-heptane; 2,2-bis(4- hydroxyphenyl)-1-phenylpropane; 2,2-bis(4-hydroxyphenyl)butane; 2,2'-methylene-bis(4-ethyl-6-tertiarybutyl phenol); 4-hydroxycoumarin; 7-hydroxy-4-methylcoumarin; 2,2'-methylene-bis(4-octyl phenol); 4,4'-sulfonyldiphenol; 4,4'-thiobis(6-tertiarybutyl-m-cresol); methyl-p-hydroxybenzoate; n-propyl-p-hydroxybenzoate; and benzyl-p-hydroxybenzoate.

Examples of other developer compounds include phenolic novolak resins which are the product of reaction between, for example, formaldehyde and a phenol such as an alkylphenol, e.g., p-octylphenol, or other phenols such as p-phenylphenol, and the like; and acid mineral materials including colloidal silica, kaolin, bentonite, aftapulgite, hallosyte, and the like. Some of the polymers and minerals do not melt but undergo color reaction on fusion of the chromogen.

Optionally, modifiers can also be included. These modifiers for example, can include acetoacetyl-o-toluidide, phenyl-1-hydroxy-2-maphthoate, 1,2-diphenoxyethane, and p-benzylbiphenyl. Optionally, though not preferred, the record material can be topcoated or use subcoats such as insulating layers or hollow spheres. The color-forming system components are substantially insoluble in the dispersion vehicle (preferably water) and are ground to an individual average particle size of between about 1 micron to about 10 microns, preferably about 1-3 microns or less. The polymeric binder material is substantially vehicle soluble although latexes are also eligible in some instances. Preferred water soluble binders include polyvinyl alcohol, hydroxyethylcellulose, methylcellulose, methyl(hydroxypropyl) cellulose, starch, modified starches, gelatin and the like. Eligible latex materials include polyacrylates, styrene-butadiene-rubber latexes, polyvinylacetates, polystyrene, and the like. The polymeric binder is used to protect the coated materials from brushing and handling forces occasioned by storage and use of thermal sheets. Binder should be present in an amount to afford such protection in an amount less than will interfere with achieving reactive contact between color-forming reactive materials.

If desired, submicron, nano-like particulates and suspension of the components of the invention can be employed and manufactured through several techniques. One technique can involve crystal precipitation. In this technique crystals are grown dissolved in solvent. A non-solvent is added to course precipitation or crystallization. Alternative techniques rely on milling or wet milling to achieve submicron particles. With these techniques the crystals are intentionally fractured and comminuted to particles smaller than the crystal size of initial formation, which varies from material to material. As sizes decrease, various effects not seen with larger particulates, are expressed, most notability more intense image density.

Small particulates can be produced by aerosol methods, or chemical mechanical grinding. This may entail a ball mill, rod mill, SAG mill, autogenous mill, pebble mill or other means of grinding or comminuting to submicron sizes. In some embodiments the material may be subjected to one or more heating steps during grinding. It is contemplated that grinding or comminuting can be conducted under ambient conditions, under an inert gas, or at elevated temperature or even in the presence of a liquid chemical agent to facilitate small particle formation. The optional liquid medium can include a solvent, surfactant, or lubricant.

Formation of nano-type or nano-like particles can involve physical and chemical methods. Physical methods include, for example, electrospray, ultrasound, spray drying, superior fluid, solvent/anti-solvent crystallization and cryogenic technology. Electrospraying is disclosed in Berger, et al., U.S. Pat. No. 3,208,951; ultrasound techniques are disclosed in Dirix, et al., U.S. Pat. No. 5,389,379 and supercritical carbon dioxide methods are disclosed in Sievers, et al., U.S. Pat. Nos. 5,639,441, 6,095,134 and 6,630,121; spray drying using compressed air is disclosed in Czekai, et al., U.S. Pat. No. 6,582,285 and Reed, et al., U.S. Pat. No. 6,431,478. In addition, emulsion polymerization, interface polymerization and coagulation/phase separation can be used to fabricate nanoparticles. The above patents are incorporated herein to the extent that they provide exemplary, procedural or other details supplementary to those set forth herein.

The adhesive layer according to an embodiment of the present invention may include any of various types of known adhesives, preferably aqueous or latex based, and may be applied wet, allowed to dry, and then heat-activated to become tacky. As examples, some common types of adhesives that could be used include water based acrylics. In the water based acrylics, water is a carrier that dries to leave the adhesive resin. Among other adhesives, the adhesives can for example include acrylate polymers with a glass transition temperature Tg>50° C. in combination with amorphous polyurethane or polyurethane-polyurea polymers with a glass transition temperature Tg<+10° C. such as taught in US Publication 20130143010, incorporated herein by reference. In alternative embodiments, adhesives can be applied in a heat softened form and then cooled, potentially to a solid. Water based adhesives are preferred.

The adhesive layer can comprises in addition a plasticizer and tackifier. With certain adhesives, physical states of an adhesive material can be controlled between solid and non-solid by altering temperature. The open time of an adhesive can be controlled by adjusting a ratio of the components, including the adhesive monomers, the plasticizer, and tackifier. The preferred activation temperature for the adhesive layer is preferably within the range of from about 50° C. to about 120° C. However, it will be understood that the invention is not limited to adhesive systems exhibiting activation temperatures within this range. Adhesive systems of this type are described in detail in US Publication 20130133532, incorporated herein by reference.

With an activatable linerless label adhesive, the properties of adhesion and viscosity change at an activation temperature. Therefore, a pressure sensitive adhesive system can be thermally switched to a more tacky state. If such adhesive system is coated on the surface of a substrate at a temperature below the designed switch temperature, the adhesive material can be in its non-sticky solid state. This permits a label construction of a substrate which can be wound in a roll form, and useful for a linerless application. During use, such as applying a label substrate to a surface, the temperature is increased so that the adhesive material changes to a non-solid state and then exhibit its pressure sensitive adhesive properties, which allows an activatable linerless label to be adhered to a substrate as desired as a result of increased adhesion properties The adhesive can be selected by way of illustration and without limitation from one or lower alkyl acrylates, styrene, methyl methacrylate, methacrylic acid, acrylic acid, one or more multifunctional monomers, and one or more chain transfer agents. The invention is not intended restricted to any one adhesive formulation. A wide array of alkyl acrylates can be used singly or in combination to form the adhesive. For example, methyl acrylate, butyl acrylate, ethyl acrylate, and 2-ethylhexyl acrylate could be used. A wide array of styrene and styrene based materials can also be used in combination. However, it will be appreciated that other analogues and functionally equivalent monomers could be used, and that various adhesives are known in the art for linerless applications.

An alternative adhesive layer can comprise various pressure sensitive and microencapsulated adhesives such as taught in Schwantes, et al., U.S. Pat. No. 8,119,214. With an encapsulated adhesive layer, the capsules are typically applied to a substrate in a binder system that is non-tacky and dry to the touch. The system can also be curable. In this way, otherwise tacky or liquid flowable adhesives can be pre-applied, but not activated or bond forming until the capsule walls themselves are fractured releasing or exposing the adhesive materials. For example, Eichel (U.S. Pat. No. 2,986,477) teaches the encapsulation of tacky adhesive materials. Wallace (U.S. Pat. No. 4,428,982) teaches the encapsulation of curable anaerobic adhesives wherein the encapsulated curable adhesive remains in a liquid or uncured state in the capsule until use. Schwantes (U.S. Pat. No. 6,592,990) teaches encapsulated adhesives, particularly pressure sensitive adhesives, wherein the adhesive is formed in-situ, after encapsulation of the ingredients therefore.

A wide array of monomers or multifunctional monomers can be used for the adhesive layer of the present invention. Multifunctional monomers can also be used to achieve cross-linking of the adhesive monomers. Representative examples of such multifunctional monomers include, but are not limited to, difunctional monomers, trifunctional monomers, and multifunctional monomers having more than three active functional sites. Useful examples of difunctional monomers include, but are not limited to 1,4-butanediol diacrylate, polyethylene glycol diacrylate, and combinations thereof. Another preferred difunctional monomer is ethylene glycol dimethacrylate. Trifunctional monomers include, but are not limited to ethoxylated trimethylolpropane triacrylate, propoxylated glycerol triacrylate, and combinations thereof. Preferred examples of multifunctional monomers having more than three active functional sites include, but are not limited to, ethoxylated pentaerythritol tetraacrylate, and combinations thereof. These and numerous other suitable multifunctional monomers are commercially available from various suppliers such as Sartomer Company, Inc. of Exton, Pa.

Optionally, the adhesive layer can comprise chain transfer agents to form activatable adhesives These are typically used at concentrations of from about 0 to about 5.0%, and preferably from about 1.0% to about 4.0% (percentages are based upon the total weight of monomer and chain transfer agent). Representative examples of suitable chain transfer agents include, but are not limited to n-dodecyl mercaptan, tert-nonyl mercaptan, isooctyl 3-mercaptopropionate, and combinations thereof. Suitable chain transfer agents are available commercially such as from Sigma Aldrich of St. Louis, Mo. The adhesive for example can comprise one or more monomers and one or more chain transfer agents.

Methods of applying adhesives include flood coating an entire surface of a substrate or selectively coating an area of the surface. Alternatively, the adhesives could comprise a dry film that is heat-activated to become tacky. The dry film may be applied to a surface of the substrate as a wet adhesive. An example of a wet adhesive is a water based acrylic adhesive. Methods of applying the dry film include covering an entire surface of a substrate with the dry film or selectively covering an area of the surface. Optionally, a heat seal layer can be included between the adhesive layers and the substrate. The heat seal layer can include a clay coating or a variety of resins. A heat seal layer can prevent heat applied to one surface from being transferred to the opposing surface of the substrate.

The adhesives can be modified to provide varying degrees of "tack," i.e., stickiness or strength of adherence, for the labels. For example, the tack of an adhesive can be varied by modifying the adhesive's chemical composition, shape, size, and thickness. With some types of adhesives, the strength of adherence varies with the amount of adhesive applied. The adhesive's tack also can be varied by selectively activating different patterns on the adhesive. The adhesives can for example include acrylate polymers with a glass transition temperature Tg>50° C. and amorphous polyurethane or polyurethane-polyurea polymers with a glass transition temperature Tg<+10° C. such as taught in Buchner et al., U.S. Pat. No. 8,980,407 B2, incorporated herein by reference.

All patents, test procedures, and other documents cited herein, including priority documents, if any, are fully incorporated by reference to the extent such disclosure is not inconsistent with this invention and for all jurisdictions in which such incorporation is permitted.

The following examples are given to illustrate some of the features of the present invention and should not be considered as limiting. In these examples all parts or proportions are by weight and all measurements are in the metric system, unless otherwise stated.

In all examples illustrating the present invention a dispersion of a particular system component can be prepared by milling the component in an aqueous solution of the binder until a particle size of less than 10 microns is achieved. The milling was accomplished in an attritor or other suitable milling device. The desired average particle size was less than 3 microns in each dispersion.

The thermally-responsive sheets were made by making separate dispersions of the chromogenic material, modifier material, and developer material. The dispersions are mixed in the desired ratios and applied to a support with a wire wound rod and dried. Other materials such as fillers, antioxidants, lubricants and waxes can be added if desired. The sheets may be calendered to improve smoothness.

Test Methods

The substrate that was coated was the paper with a basis wt of 60 gsm and a BOPP film of a basis wt. of 62 gsm such as FPG 80 provided by YUPO Corporation. The thermal coloring layer was coated at 2.0 gsm and the protective layer was coated at 1.5 gsm over both substrates. This provided the final surface upon which to coat the release coatings. To this final surface, the release coatings were applied at 1.5 gsm for the evaluations set forth in this disclosure. The samples were tested for their abilities with respect to scuff resistance, release and printability on press.

Scuff Resistance

Samples were tested using the Atlas Crockmeter CM-5. Black cloth is mounted and rubbed across the sample for ten complete passes. After the tenth passes, the black cloth is examined to determine the amount of coating scuffed off from the surface. For purposes of the scuff resistance test:
PASS (O): a sample with minimal or no white buildup.
FAIL (X): a sample with white buildup on the black cloth.

Release

Samples were testing for release using 3M 600 tape. Peel was tested using Labmaster 80-91 at 90 deg and 600 ipm (15.2 meters per minute). For purposes of the release test:

PASS (O): <50 N/m and peeling was performed with slight resistance but no practical problem.

FAIL (X): >50 N/m and peeling was performed with severe resistance and/or label was torn.

Press Printing

Printing was performed using a flexo press using water based as well as UV inks. The water based ink used was Siegwerk Ultra Imaging Red. The UV ink used was Flint Flexocure FORCE blue. Both were applied with a 600 anilox. After printing the samples were inspected using an 8× adjustable eyepiece for voids in the applied ink. For purposes of the press printing test:

PASS (O): a sample that does not exhibit voids in applied ink upon inspection.

FAIL (X): a sample that experiences several voids or complete repellency of the applied ink.

The following examples are given to illustrate some of the features of the present invention and should not be considered as limiting. In these examples all parts or proportions are by weight and all measurements are in the metric system, unless otherwise stated.

| Dispersion A- Chromogenic Material | Parts |
|---|---|
| 3-Dibutylamino-6-methyl-N-anilinofluoran | 30.0 |
| Aqueous solution of Polyvinyl alcohol in an amount of 20% | 25.0 |
| Defoaming and dispersing agents | 0.4 |
| Water | 44.6 |

| Dispersion B- Developer Material | Parts |
|---|---|
| Bis(4-hydroxy-3-allylphenyl)sulphone | 38.0 |
| Aqueous solution of Polyvinyl alcohol in an amount of 20% | 18.0 |
| Defoaming and dispersing agents | 0.4 |
| Water | 43.6 |

| Thermal coloring layer | Parts |
|---|---|
| Dispersion A (Chromogenic Material) | 22.0 |
| Dispersion B (Developer Material) | 39.0 |
| Binder, 50% SBR in water | 6.0 |
| Filler slurry, 30% Silica in water | 25.0 |
| Water | 8.0 |

| Protective layer (Topcoat) | Parts |
|---|---|
| Filler slurry, 30% Aluminium hydroxide in water | 23.0 |
| Aqueous solution of Polyvinyl alcohol in an amount of 10% | 63.0 |
| Zinc state in an amount of 44% in water | 1.0 |
| Crosslinker, 12.5% in water | 13.0 |

| Release Coating Layer 1 | Parts |
|---|---|
| Silicone Emulsion (DEHESIVE 490 by Wacker Chemical Corporation) | 70.8 |
| Silicone Crosslinker emulsion (CROSSLINKER V 15 by Wacker Chemical Corporation) | 16.2 |
| Platinum catalyst (CATALYST EM 459 by Wacker Chemical Corporation) | 13.0 |

Total Pt. concentration 222.6 ppm

Filler (Silica)

Filler 1: Precipitated silica (Mizukasil P-527 by Mizusawa Industrial Chemicals Ltd.)

Filler 2: Fumed silica (HDK V15 by Wacker Chemie AG.)

Filler 3: Fumed silica (Aerosil 200 by Evonik Industries)

Filler 4: Fumed silica (Konasil K300 by OCI Company Ltd.)

| Control | Parts |
|---|---|
| Release Coating Layer 1 | 50.0 |
| Water | 50.0 |

Total dry filler 0%

| Example 1a | Parts |
|---|---|
| Release Coating Layer 1 | 47.5 |
| Water | 51.3 |
| Filler 1 | 1.2 |

Total dry filler 5.0%

| Example 1b | Parts |
|---|---|
| Release Coating Layer 1 | 45.0 |
| Water | 52.6 |
| Filler 1 | 2.4 |

Total dry filler 10.0%

| Example 1c | Parts |
|---|---|
| Release Coating Layer 1 | 40.0 |
| Water | 55.1 |
| Filler 1 | 4.9 |

Total dry filler 20.0%

Example 1d

|  | Parts |
|---|---|
| Release Coating Layer 1 | 28.7 |
| Water | 65.3 |
| Filler 1 | 6.0 |

Total dry filler 30.0%

Example 1e

|  | Parts |
|---|---|
| Release Coating Layer 1 | 20.9 |
| Water | 72.3 |
| Filler 1 | 6.8 |

Total dry filler 40.0%

Example 2a

|  | Parts |
|---|---|
| Release Coating Layer 1 | 47.5 |
| Water | 51.3 |
| Filler 2 | 1.2 |

Total dry filler 5.0%

Example 2b

|  | Parts |
|---|---|
| Release Coating Layer 1 | 45.0 |
| Water | 52.6 |
| Filler 2 | 2.4 |

Total dry filler 10.0%

Example 2c

|  | Parts |
|---|---|
| Release Coating Layer 1 | 40.0 |
| Water | 55.1 |
| Filler 2 | 4.9 |

Total dry filler 20.0%

Example 2d

|  | Parts |
|---|---|
| Release Coating Layer 1 | 28.7 |
| Water | 65.3 |
| Filler 2 | 6.0 |

Total dry filler 30.0%

Example 2e

|  | Parts |
|---|---|
| Release Coating Layer 1 | 20.9 |
| Water | 72.3 |
| Filler 2 | 6.8 |

Total dry filler 40.0%

Example 3a

|  | Parts |
|---|---|
| Release Coating Layer 1 | 47.5 |
| Water | 51.3 |
| Filler 3 | 1.2 |

Total dry filler 5.0%

Example 3b

|  | Parts |
|---|---|
| Release Coating Layer 1 | 45.0 |
| Water | 52.6 |
| Filler 3 | 2.4 |

Total dry filler 10.0%

Example 3c

|  | Parts |
|---|---|
| Release Coating Layer 1 | 40.0 |
| Water | 55.1 |
| Filler 3 | 4.9 |

Total dry filler 20.0%

Example 3d

|  | Parts |
|---|---|
| Release Coating Layer 1 | 28.7 |
| Water | 65.3 |
| Filler 3 | 6.0 |

Total dry filler 30.0%

Example 3e

|  | Parts |
|---|---|
| Release Coating Layer 1 | 20.9 |
| Water | 72.3 |
| Filler 3 | 6.8 |

Total dry filler 40.0%

Example 4a

|  | Parts |
|---|---|
| Release Coating Layer 1 | 47.5 |
| Water | 51.3 |
| Filler 4 | 1.2 |

Total dry filler 5.0%

Example 4b

| | Parts |
|---|---|
| Release Coating Layer 1 | 45.0 |
| Water | 52.6 |
| Filler 4 | 2.4 |

Total dry filler 10.0%

Example 4c

| | Parts |
|---|---|
| Release Coating Layer 1 | 40.0 |
| Water | 55.1 |
| Filler 4 | 4.9 |

Total dry filler 20.0%

Example 4d

| | Parts |
|---|---|
| Release Coating Layer 1 | 28.7 |
| Water | 65.3 |
| Filler 4 | 6.0 |

Total dry filler 30.0%

Example 4e

| | Parts |
|---|---|
| Release Coating Layer 1 | 20.9 |
| Water | 72.3 |
| Filler 4 | 6.8 |

Total dry filler 40.0%

Result tables TABLE 1 and TABLE 2 are reproduced for illustration puporses below.

TABLE 1
Coating on TC paper

| Coating | Release | Scuff | Press print UV | Press print Water |
|---|---|---|---|---|
| Control | ○ | X | X | X |
| Example 1a | ○ | X | X | X |
| Example 1b | ○ | X | X | X |
| Example 1c | ○ | ○ | X | X |
| Example 1d | ○ | ○ | ○ | X |
| Example 1e | X | ○ | ○ | ○ |
| Example 2a | ○ | X | X | X |
| Example 2b | ○ | ○ | X | X |
| Example 2c | ○ | ○ | ○ | X |
| Example 2d | ○ | ○ | ○ | ○ |
| Example 2e | X | ○ | ○ | ○ |
| Example 3a | ○ | ○ | X | X |
| Example 3b | ○ | ○ | ○ | X |
| Example 3c | ○ | ○ | ○ | ○ |
| Example 3d | ○ | ○ | ○ | ○ |
| Example 3e | X | ○ | ○ | ○ |
| Example 4a | ○ | ○ | X | X |
| Example 4b | ○ | ○ | ○ | X |
| Example 4c | ○ | ○ | ○ | ○ |
| Example 4d | ○ | ○ | ○ | ○ |
| Example 4e | X | ○ | ○ | ○ |

TABLE 2
Coating on TC film

| Coating | Release | Scuff | Press print UV | Press print Water |
|---|---|---|---|---|
| Control | | X | X | X |
| Example 1a | ○ | X | X | X |
| Example 1b | ○ | X | X | X |
| Example 1c | ○ | X | X | X |
| Example 1d | ○ | X | ○ | X |
| Example 1e | X | X | ○ | ○ |
| Example 2a | ○ | X | X | X |
| Example 2b | ○ | ○ | X | X |
| Example 2c | ○ | ○ | ○ | X |
| Example 2d | ○ | ○ | ○ | ○ |
| Example 2e | X | ○ | ○ | ○ |
| Example 3a | ○ | X | X | X |
| Example 3b | ○ | ○ | X | X |
| Example 3c | ○ | ○ | ○ | X |
| Example 3d | ○ | ○ | ○ | ○ |
| Example 3e | X | ○ | ○ | ○ |
| Example 4a | ○ | X | X | X |
| Example 4b | ○ | ○ | X | X |
| Example 4c | ○ | ○ | ○ | ○ |
| Example 4d | ○ | ○ | ○ | ○ |
| Example 4e | X | ○ | ○ | ○ |

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

All percentages, parts, and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Uses of singular terms such as "a," "an," are intended to cover both the singular and the plural, unless otherwise indicated herein or clearly contradicted by context. The terms "comprising," "having," "including," and "containing" are to be construed as open-ended terms. All references, including publications, patent applications, and patents, cited herein are hereby incorporated by reference. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A silicone release coating material for a thermally-responsive record material useful for linerless labels,
   comprising, before being cured, an aqueous mixture of a release coating layer material and a hydrophilic silica,
   wherein the release coating layer material weighs 28.7%-40.0% of the silicone release coating material,
   wherein the release coating layer material comprises a silicone emulsion, a silicone crosslinker emulsion and a platinum catalyst, wherein the silicone emulsion weighs 70.8% of the release coating layer material, the silicone crosslinker emulsion weighs 16.2% of the release coating layer material, and the platinum catalyst weighs 13.0% of the release coating layer material,
   wherein the hydrophilic silica is precipitated silica or fumed silica, the hydrophilic silica weighs 20%-30% of dry components of the silicone release coating material,
   wherein the silicone release coating material is configured to be deposited on the thermally-responsive record material comprising a substrate having first and second surfaces, at least the first surface comprising:
   a binder; and
   a heat sensitive coating having one or more layers of a colorless dye precursor and an acidic developer material in contiguous relationship,
   wherein the silicone release coating material is formed in direct contact with the heat sensitive coating,
   wherein the heat sensitive coating upon being heated reacts with the colorless dye precursor to develop color, and
   wherein the silicone release coating material is cured at a temperature at or below 160° C.

2. The silicone release coating material according to claim 1, wherein an excess of platinum catalyst is greater than 191 ppm, based on the total weight of the silicone release coating material.

3. The silicone release coating material according to claim 1, wherein the fumed silica has a surface area over 175 $m^2/g$.

4. The silicone release coating material according to claim 1, wherein the thermally-responsive record material includes in addition an adhesive layer on the second surface of the substrate.

5. The silicone release coating material according to claim 1, wherein the platinum catalyst is selected from a group consisting of a metallic platinum, a platinum salt, and an organic platinum compound.

6. The silicone release coating material according to claim 1, wherein the platinum catalyst has an oxidation state from 0 to IV.

7. The silicone release coating material according to claim 1, wherein the platinum catalyst comprises a platinum catalyst selected from the group consisting of chloroplatinic acid and olefin complexes, platinum (0) complexes containing vinyl-siloxane ligands, platinum (II) chloride, salts of chloroplatinic acid, tetrachloroplatinic acid, platinum (IV) chloride, hexachloroplatinic acid, hexachloroplatinic acid ammonium salt, platinum (II) oxide, platinum (II) hydroxide, platinum (IV) dioxide, platinum (IV) oxide, platinum (IV) disulfide, platinum (IV) sulfide, potassium hexachloroplatinate (IV), dichloro(cycloocta-1,5-diene) platinum (II), and ammonium salts of chloroplatinic acid.

8. The silicone release coating material according to claim 1, wherein the silicone release coating material is applied at a rate of 1 to 6 grams per square meter (gsm).

9. A method of providing a thermally-responsive record material useful for linerless labels with a silicone release coating material, the thermally-responsive record material comprising a support having first and second surfaces, the method comprising:
   applying to at least the first surface of the support a heat sensitive color-forming composition comprising a binder material and a colorless dye precursor and an acidic developer material in contiguous relationship;
   applying the silicone release coating material over the heat sensitive color-forming composition, the silicone release coating material comprising an aqueous mixture of a release coating layer material and a hydrophobic silica, wherein the release coating layer material weighs 28.7%-40.0% of the silicone release coating material, wherein the release coating layer material comprises a silicone emulsion, a silicone crosslinker emulsion and a platinum catalyst, wherein the silicone emulsion weighs 70.8% of the release coating layer material, the silicone crosslinker emulsion weighs 16.2% of the release coating layer material, and the platinum catalyst weighs 13.0% of the release coating layer material, wherein the hydrophilic silica is precipitated silica or fumed silica, the hydrophilic silica is weighs 20%-30% of dry components of the silicone release coating material, wherein the silicone release coating material is in direct contact with the heat sensitive color-forming composition; and
   curing the silicone release coating material at a temperature at or below 160° C.

10. The method according to claim 9, wherein an excess of platinum catalyst is greater than 191 ppm, based on the total weight of the silicone release coating material.

11. The method according to claim 9, wherein the fumed silica has a surface area over 175 $m^2/g$.

12. The method according to claim 9, wherein the platinum catalyst has an oxidation state from 0 to IV.

13. The method according to claim 9, wherein the platinum catalyst comprises a platinum catalyst selected from the group consisting of chloroplatinic acid and olefin complexes, platinum (0) complexes containing vinyl-siloxane ligands, platinum (II) chloride, salts of chloroplatinic acid, tetrachloroplatinic acid, platinum (IV) chloride, hexachloroplatinic acid, hexachloroplatinic acid ammonium salt, platinum (II) oxide, platinum (II) hydroxide, platinum (IV) dioxide, platinum (IV) oxide, platinum (IV) disulfide, platinum (IV) sulfide, potassium hexachloroplatinate (IV), dichloro(cycloocta-1,5-diene) platinum (II), and ammonium salts of chloroplatinic acid.

14. The method according to claim 9, wherein the silicone release coating material is applied at a rate of 1 to 6 grams per square meter (gsm).

\* \* \* \* \*